United States Patent [19]
Freed

[11] Patent Number: 5,865,215
[45] Date of Patent: Feb. 2, 1999

[54] MULTICANNULAR FLUID DELIVERY SYSTEM WITH ATTACHED MANIFOLD RINGS

[76] Inventor: John F. Freed, 3 E. Pine St., Granville, N.Y. 12832

[21] Appl. No.: 986,070

[22] Filed: Dec. 5, 1997

[51] Int. Cl.$^6$ ................................................ F16L 9/00
[52] U.S. Cl. ........................... 138/109; 138/113; 138/115
[58] Field of Search ..................................... 138/109, 113, 138/115, 112, 114; 285/133.1, 133.2

[56] References Cited

U.S. PATENT DOCUMENTS

| | | | |
|---|---|---|---|
| 1,736,923 | 11/1929 | Lalonde | 138/115 |
| 3,464,450 | 9/1969 | Steffenini | 138/113 |
| 4,754,782 | 7/1988 | Grantham | 138/109 |
| 5,277,242 | 1/1994 | Arrington | 138/113 |
| 5,611,373 | 3/1997 | Ashcraft | 138/113 |

*Primary Examiner*—Denise L. Ferensic
*Assistant Examiner*—James F. Hook
*Attorney, Agent, or Firm*—John J Welch, Jr. Esq.

[57] ABSTRACT

The instant invention consists of an inner cannula of hosing amenable to transport of a liquid coupled with an outer cannula of hosing amenable to transport of a gas. As respects two embodiments, affixed to outer walling of the inner cannula and to inner walling of the outer cannula are rigid struts, typically three or four, at 120° or at right angles with respect to one another at various points along the respective lengths of the hosing that serve to maintain separation of the cannulae from one another at times when the inner cannula is filled with a liquid and the outer cannula is filled with a gas. A third embodiment is strut free. Each cannula has an ingress end whereat a liquid is introduced into the inner cannula and whereat a gas is introduced via an extrusion found on the outer side of the first manifold ring into the outer cannula. Each cannula likewise has an egress end characterized by the presence of a second manifold ring component whereat the liquid is expelled typically from a nozzle threat located and affixed thereto and the gas is amenable to discharge via the opening of a valve component affixed to an extrusion found on the outer side of the second manifold ring component of the instant invention.

16 Claims, 7 Drawing Sheets

MULTICANNULAR FLUID DELIVERY SYSTEM WITH ATTACHED MANIFOLD RINGS

FEDERALLY SPONSORED RESEARCH AND DEVELOPMENT

There is no federally sponsored research and development to which the instant invention relates.

CROSS REFERENCES TO PRIOR OR PARENT APPLICATIONS

The instant invention is a combination of some of the component parts of that certain invention which is the subject of your inventor's patent application with Ser. No. 08/896,020 entitled, "A Multicannular Fluid Delivery System".

BACKGROUND OF THE INVENTION

1. Field of the Invention

The instant invention is one of those devices characterized by hosing amenable to transport of fluids under pressure.

2. Prior Art

Your inventor is not aware of any prior art that in any way resembles the instant invention.

A SUMMARY OF THE INVENTION

1. A Brief Description of the Invention

The instant invention is a multicannular fluid delivery system with attached manifold rings consisting of inner hosing circumscribed by outer hosing with a first manifold ring, characterized by the presence of a center through hole, affixed to a first end of the inner hosing and a first end of the outer hosing such that gas under pressure from the situs of a pump via piping can ultimately enter the manifold ring through an extrusion protruding from a circumferential side of the ring and from that point enter into a hollow space within the body of the ring to exit therefrom through a plurality of holes emanating from the space, through the body of the ring into space between the hosing components and with a second manifold ring, characterized by the presence of a center through hole, affixed to a second end of the inner hosing and a second end of the outer hosing with a plurality of holes within the body of the second ring amenable to permitting gas within the space between the hosing components to enter a hollow space within the body of this ring and ultimately emanate to outer atmosphere when a valve component affixed to an extrusion protruding from a circumferential side thereof is in an open position.

2. Objects of the Invention

The instant invention serves as an integral combination of some of the component parts of that certain invention which is the subject of your inventor's patent application with Ser. No. 08/896,020 entitled, "A Multicannular Fluid Delivery System.

The essential object of the instant invention is to facilitate to the fullest possible extent the proper and effective functioning of the above-mentioned multicannular fluid delivery system in respect of militating against the uncontrolled pressurized fluid flow from broken hosing of a hazardous substance such as liquid propane or sulfuric acid into surrounding environs. As regards accommodation of the foregoing objective, it is respectfully submitted that the instant new and unique invention is moreover, unquestionably useful.

A DESCRIPTION OF THE DRAWINGS

A DESCRIPTION OF THE PREFERRED EMBODIMENT

Figure 1:
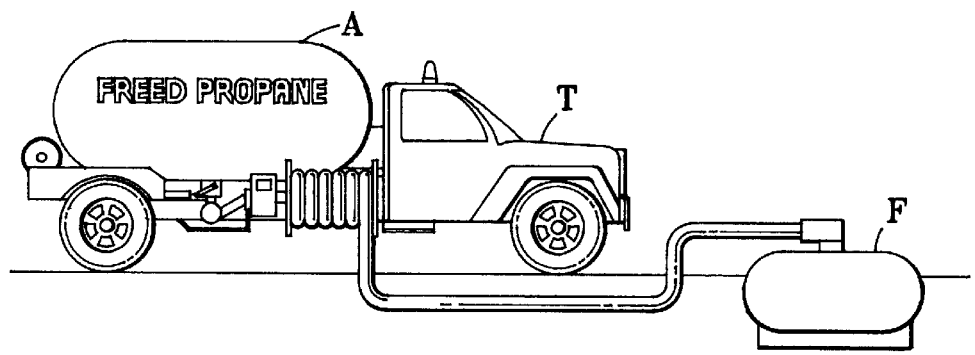
FIG. 1 shows a home delivery fuel truck equipped with a first bulk transfer tank with hosing leading to a second bulk tank.
Figure 2A:
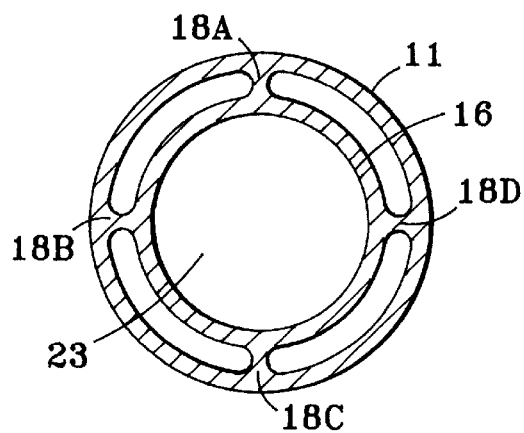
FIGS. 2A, 2B and 2C are vertically inclined cross-sectional views of variant forms of the multicannular hosing component of the instant invention.
Figure 2B:
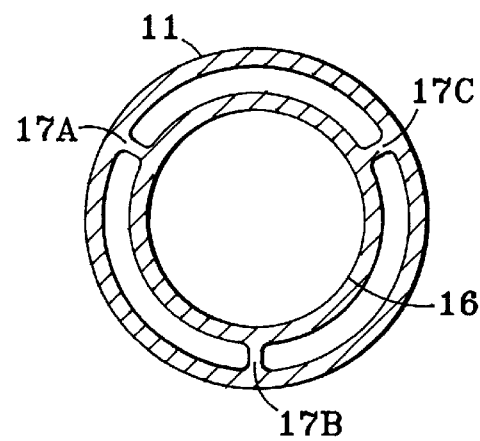
Figure 2C:
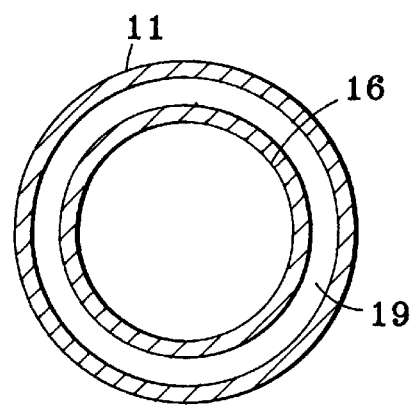
Figure 3:
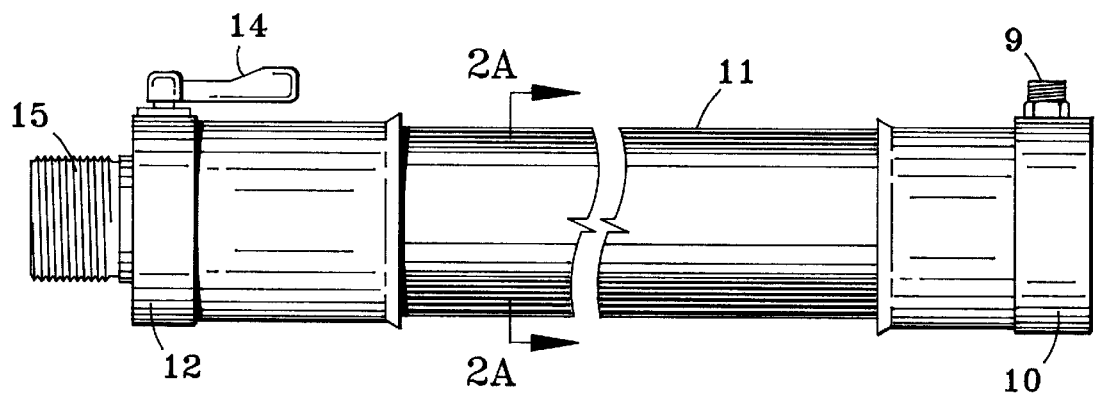
FIG. 3 is a broken plan view of the exterior of the outer hosing component of the instant invention.
Figure 4:
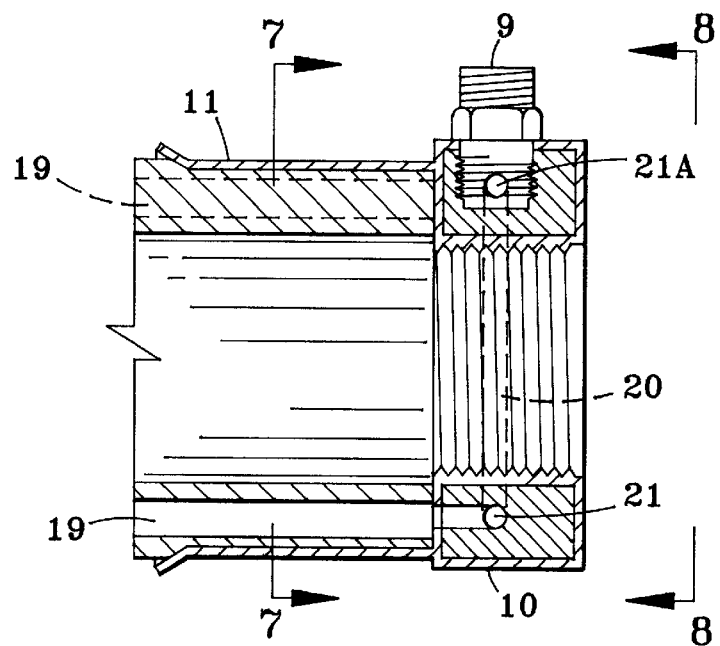
FIG. 4 is a vertically inclined cross sectional view of the one of the manifold ring components of the instant invention positionable at the ingress end thereof and shown affixed to the hosing components of the instant invention.
Figure 9:
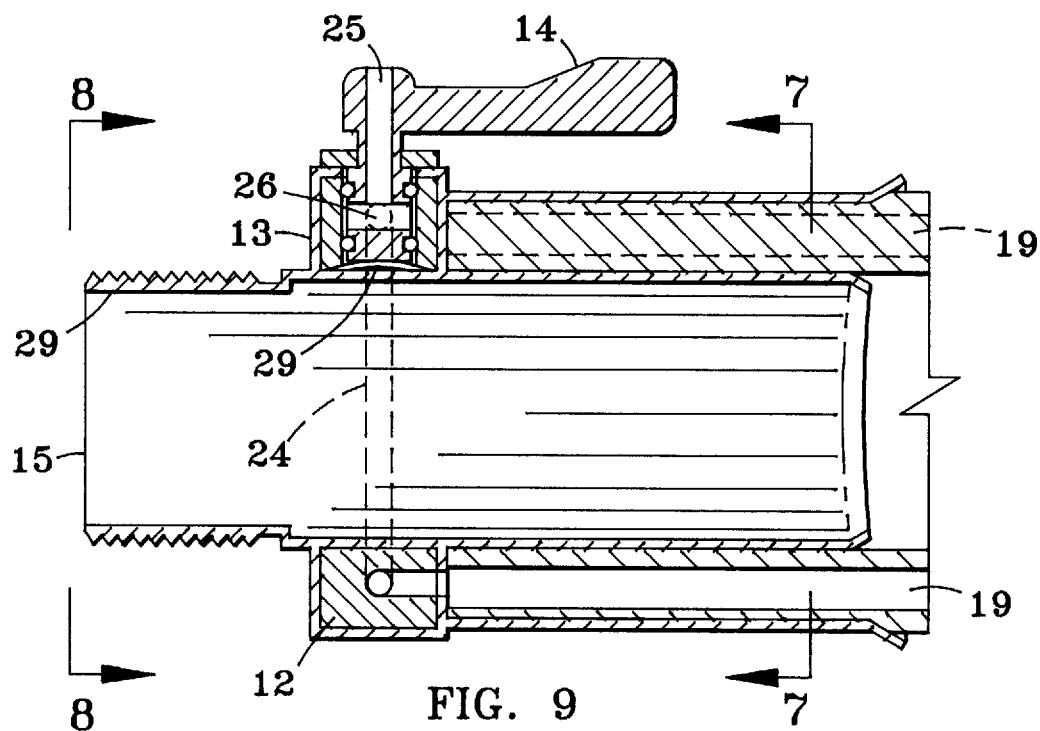
FIG. 9 is a vertically inclined cross sectional view of the one of the manifold ring components of the instant invention positioned at an egress end thereof.
Figure 13:
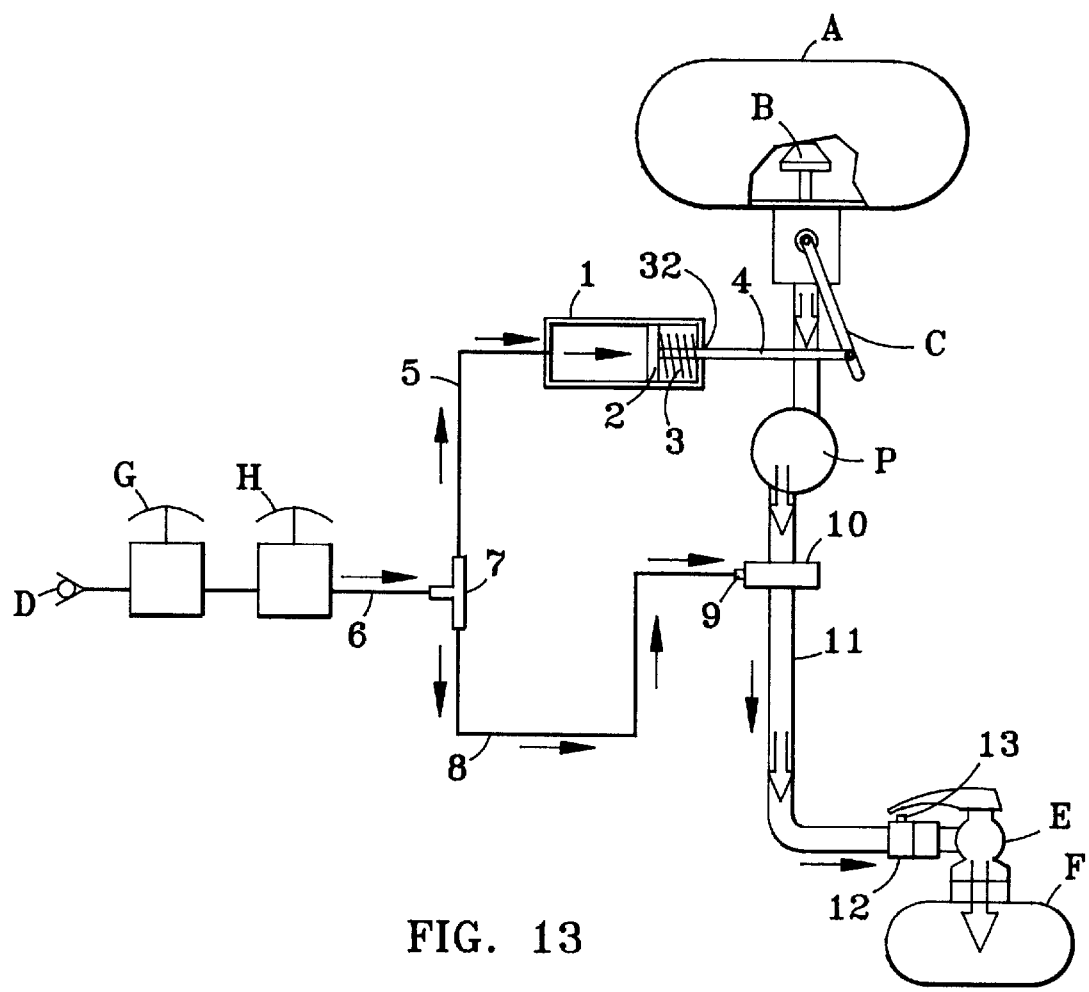
FIG. 13 is a schematic view of the instant invention with fluid flowing.

FIG. 1 shows a home delivery fuel truck T equipped with an initial storage site, a first bulk transfer tank A and the instant invention serving to effectuate, in a uniquely safe manner, the transfer of fuel from tank A to a subsequent storage site, for example, a second bulk tank F such as might be found in a typical residential home. FIG. 3 shows the whole of the instant invention as viewed exteriorly. A first manifold ring component 10 equipped with a hollow extrusion 9 is affixed to outer hosing component 11 and inner hosing component 16 to both of which second manifold ring component 12 is also affixed. Manifold ring component 10 is at an ingress end of outer hosing component 11 and inner hosing component 16 and manifold ring component 12 is at egress ends thereof Ring component 12 has valvular means 14 and nozzle means 15 affixed thereto as likewise seen with reference to FIG. 3. FIGS. 2A, 2B and 2C show outer hosing component 11 circumscribing inner hosing component 16. Each of these figures evidence different embodiments of the instant invention. FIG. 2C shows one embodiment. FIG. 2A, a second embodiment, shows 4 rigid struts 18A, 18B, 18C and 18D, separating hosing components 11 and 16 and FIG. 2B, yet, another embodiment shows 3 rigid struts, 17A, 17B and 17C separating hosing components 11 and 16. The struts are affixed to outer walling of inner hosing component 16 and inner walling of outer hosing component 11 and are found at various points along the lengths of hosing components 11 and 16 between first manifold ring 10 shown in FIG. 4 and second manifold ring 12 shown in FIG. 9 in order to maintain the integrity of spacing 19 as between hosing components 11 and 16 so as to better facilitate the flow of gas within spacing 19. But, the invention is not necessarily in need of such struts and can function as per FIG. 2C without them. However, the three strut configuration as shown in FIG. 2B would be the most preferred embodiment in terms of ergonomic efficacy in respect of maintaining continuous spacing as between components 11 and 16. Fluid disembarking an initial storage site within a first bulk transfer tank A by way of an open release valve B in tank A is pumped as seen in FIG. 13 under pressure by a pump D through inner hosing component 16 and a first center through hole 22 of first manifold ring 10 seen in FIG. 5. The fluid flows the length of hosing component 16 along inner cannula 23 seen in FIG. 2A to where it encounters center through hole 28 in second manifold ring 12 seen in FIG. 7. The fluid then proceeds by way of nozzle means 15 affixed to an outside end side of manifold ring 12 as seen in FIG. 9 and then into a portal E of a subsequent storage site or second bulk tank F as seen in FIG. 13. The fluid flowing under pressure is perhaps highly inflammable, combustible propane or perhaps highly corrosive sulfuric acid or sodium hydroxide. If the intertank hosing system or fittings connected therewith and serving to transfer such fluid were to break while such a fluid substance was flowing, with a release valve open, an ecological catastrophe could easily result in the time it would taken to shut off the release valve after the onset of the break in the line or fitting. Such a catastrophe could take the form of egrecious ecological contamination on the one hand to indeed perhaps even a deadly explosion on the other. The instant invention in respect of its various embodiments addresses such a problem by way of serving to ensure that once breakage is imminent that then aforementioned release valve B is immediately shut down thereby averting any mass spills of fluid into the surroundings about the intertank hosing and related fittings and concomitantly averting any patently massive contamination or explosions. The only fluid that would find its way into the surroundings with resort to utilization of the instant invention would be at most only that relatively small amount thereof as would be located within the intertank hosing, but, clearly no more than that.

Figure 5:
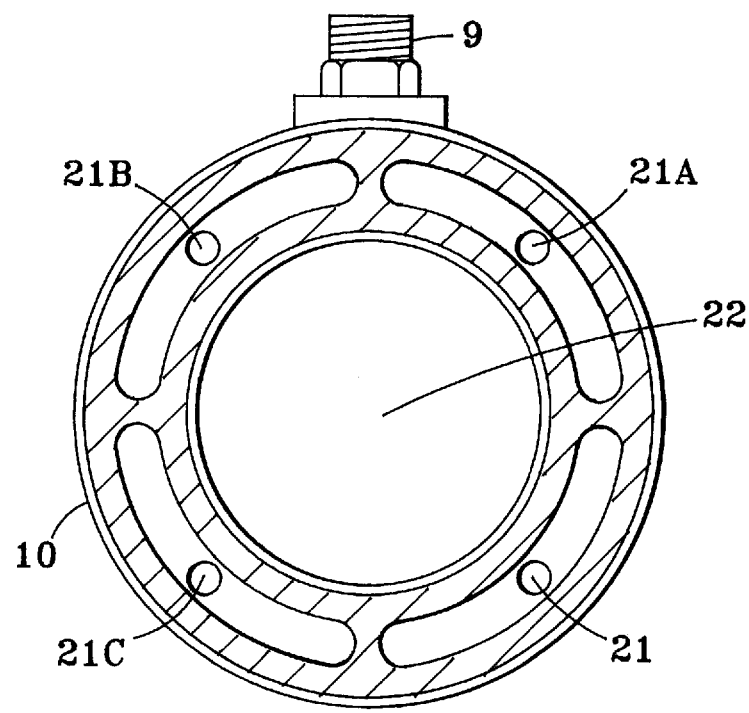
FIG. 5 is an on-end cross sectional view of the one of the manifold ring components of the instant invention shown in FIG. 4.
Figure 6:
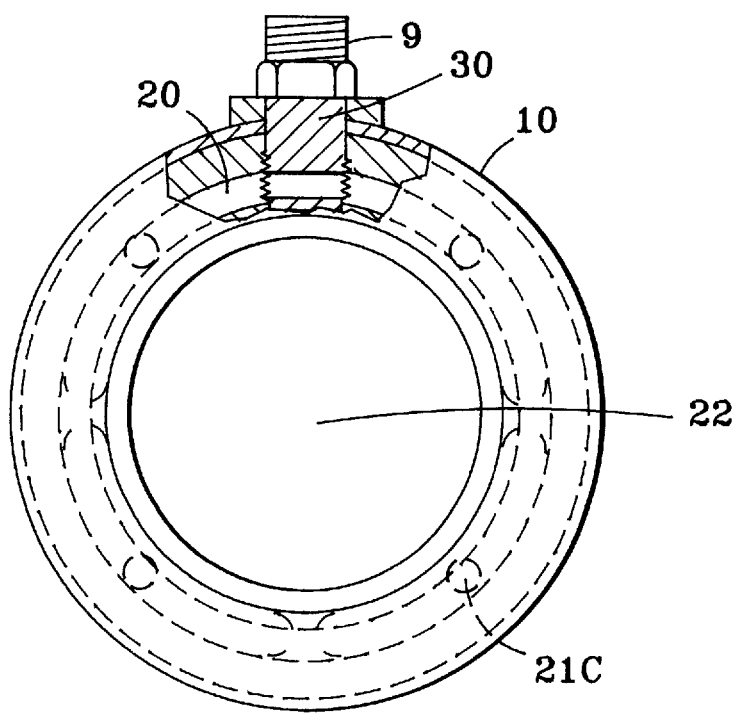
FIG. 6 is an on end cross sectional view opposite the view as seen in FIG. 5 of the one of the manifold ring components of the instant invention positionable at the ingress end thereof.
Figure 7:
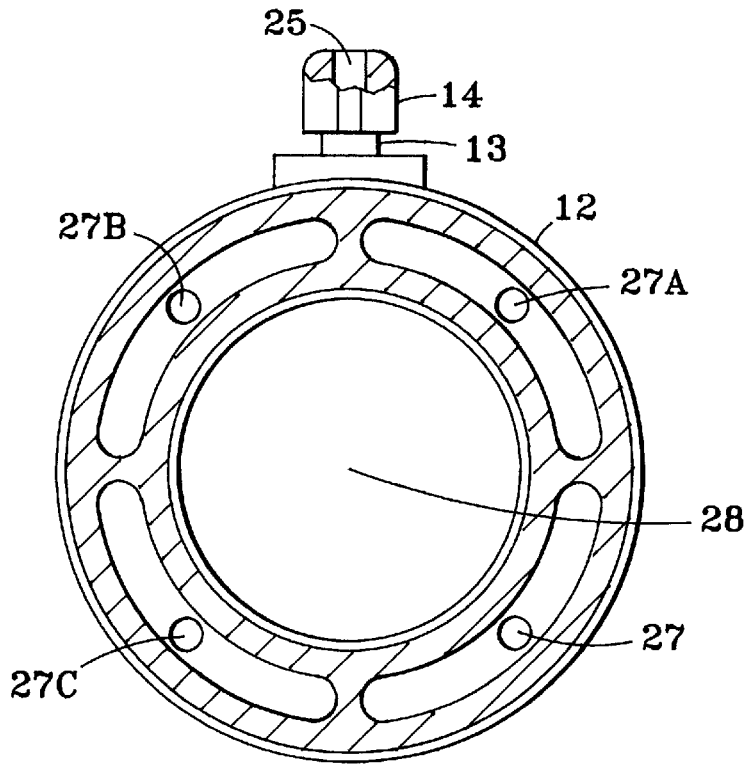
FIG. 7 is an on end cross sectional view of the one of the manifold ring components of the instant invention positionable at the egress end thereof shown.
Figure 8:
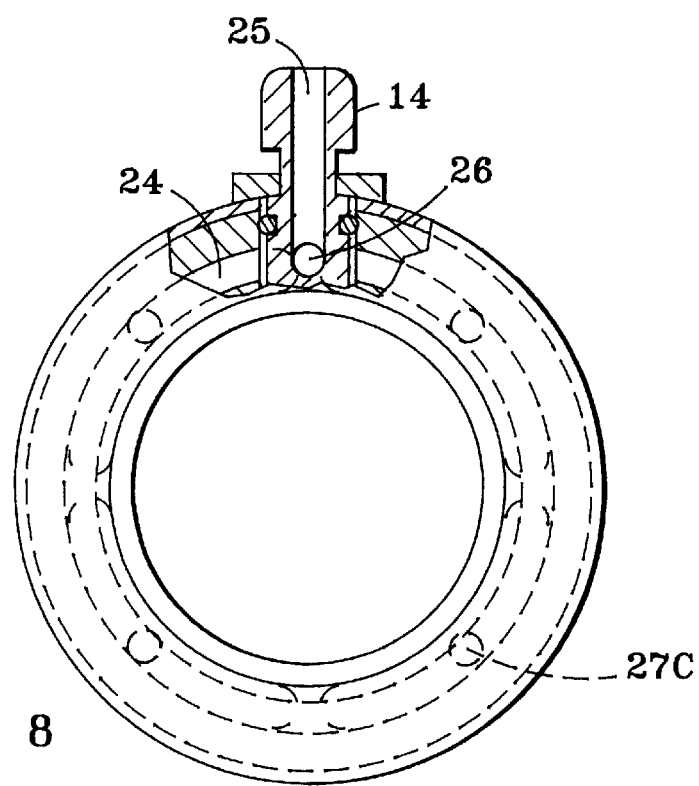
FIG. 8 is an on end cross-sectional view opposite the view as seen in FIG. 7 of the one of the manifold ring components of the instant invention positionable at the egress end thereof.
Figure 10:
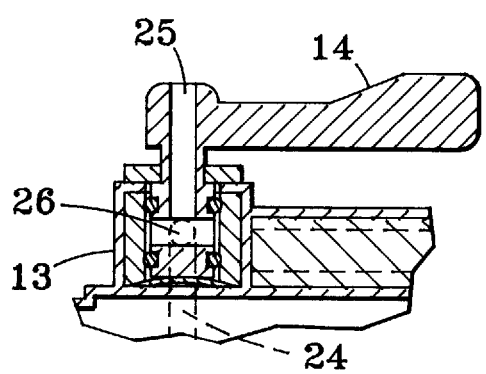
FIG. 10 is a close up view of the valvular component of the instant invention.
Figure 11:
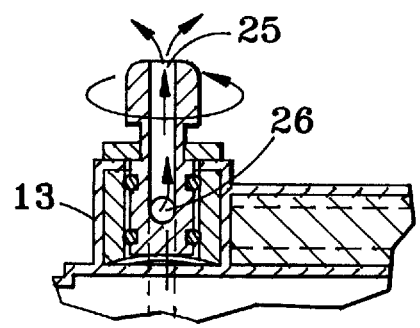
FIG. 11 is a close up view of the valvular component of the instant invention turned through an angle of 90°.
Figure 12:
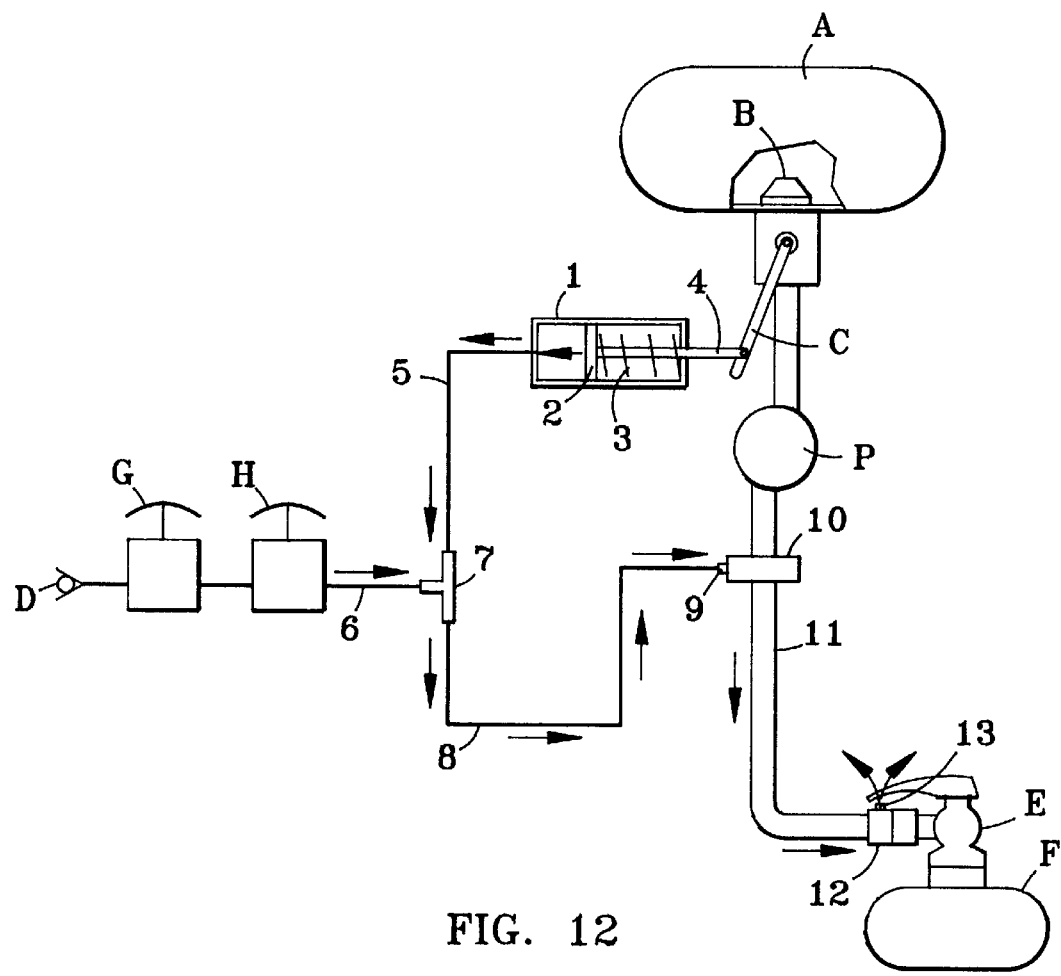
FIG. 12 is a schematic view of the instant invention without fluid flowing.

A gas such as nitrogen or indeed even air is propelled from a pump site D under pressure via first piping means 6 to a T shaped hollow fitting 7 all as seen in FIG. 13. Second piping means 8 connected to and leading from one end of fitting 7 run to and are connected to first hollow extrusion 9 found on the circumferential outer surface of first manifold ring 10, Third piping means 5 connected to and leading from a second end of fitting 7 run to and are connected to an actuation chamber 1 via a through hole 31. Within chamber 1 there is an actuation cylinder 2 connected to a lever arm 4 that extends out of chamber 1 through a second through hole 32. Lever arm 4 is pivotably connected to lever arm C which is connected to and operates to open or close release valve B. Actuation cylinder 2 is spring loaded with a spring 3 as depicted in FIGS. 12 or 13. The gas under pressure depicted by black arrows in FIG. 13 causes actuation cylinder 2 to push lever arm 4 so as to cause lever arm C to cause release valve B to open allowing fluid depicted by white arrows in FIG. 13 to flow through inner hosing component 16. The gas under the pressure needed to compress spring loaded actuation cylinder 2 enters first hollow extrusion 9 affixed to the outer circumferential surface of the cylindrically shaped body portion of first manifold ring 10 as seen in FIG. 6 and from there passes directly into a hollowed out cylindrically shaped first ring space 20 located within the cylindrically shaped body portion of first manifold ring 10 as can be visualized with resort to FIG. 6. In lieu of an extrusion 9, there could instead be only a through hole 30 as seen in FIG. 6 in the outer surface of manifold ring 10 about which an end of second piping means 8 could be connected to manifold ring component 10. From hollow space 20, within manifold ring component 10, the gas passes through a plurality of ancillary first ring holes 21, 21A, 21B and 21C found in an outer end side of manifold ring 10 as seen in FIGS. 5 and 6 and into spacing 19 as between outer walling of inner hosing component 16 and inner walling of outer hosing component 11. The gas traverses the length of spacing 19 until it reaches a plurality of ancillary second ring holes, 27, 27A, 27B and 27C in an inner end side of second manifold ring 12, as are seen in FIGS. 7 and 8 and from there into hollowed out cylindrically shaped second ring space 24 located within the cylindrically shaped body portion of second manifold ring 10 as can be visualized with resort to FIG. 8. From hollow space 24 the gas passes up to the site of valvular means 14 affixed to the circumferential outer surface of second manifold ring 12 and completely covering and sealing an outer second ring through hole 29 as seen in FIG. 9 through which the gas passes from hollow space 24 to reach and when facilitated pass through a hole 26 in valvular means 14 affixed to the circumferential outer surface of second manifold ring 12 and out into surrounding atmosphere as depicted in FIG. 11. Alternatively, in lieu of merely an outer second ring through hole 29, a hollow extrusion 13 as seen in FIG. 9 or FIG. 10 or FIG. 11 could be comparably located affixed to the circumferential outer surface of the cylindrically shaped body portion of manifold ring 12 to facilitate the holding in place of valvular means 14 or alternatively such an extrusion 13 could be amenable to being completely covered and sealed by valvular means 14. With valvular means 14 closed as seen in FIG. 9 or FIG. 10, gas pressure at the level of the pressure at pump D is maintained, within spacing between hosing components 11 and 16 and within actuation chamber 1 upon actuation cylinder 2 so as to keep release valve B open to thereby permitting fluid to flow under pressure from pump D, from tank A to a portal E of a tank F. If, however, for any reason, the pressure in the periphery of the system is, in any way diminished, as, for example, perforce of a break in the walling of outer hosing component 11 or at the site of either manifold ring 10 or 12, then, the pressure within actuation chamber 1 will immediately fall, spring loaded actuation cylinder 2 will move forward pulling lever arm 4 in turn pulling lever arm C so as to effect closure of release valve B. Moreover, as can be noted with resort to FIG. 11, a turning of valvular means 14 through an angle of 90°, for example, in the event of a perceived break in walling of inner hosing 16 or fear of initiation of flash fire conditions about the location of a tank A, by a person holding outer hosing 11 near the location of nozzle 15, will similarly effect closure of release valve B. Such gas pressure dependency constitutes a remarkable safety feature as respects the instant invention, since, such dependency totally obviates the possibility of a significant ecological catastrophe such as might otherwise readily occur with mass spillage of inflammable or corrosive fluid being continuously pumped under pressure in the face of any such breakage from the moment of such breakage to the time when someone might be, at last, able to deactivate pump P. This sort of safety concern, absent utilization of the instant invention to pump, for example, highly volatile propane from a tank or a truck into a tank at a home residence, is what is so disconcerting to delivery persons in the face of a break in hosing during the course of home delivery. Such delivery persons are understandably very reluctant to leave the nozzle end of hosing broken at some point to return to the locus of a source truck a number of feet away to turn off a compressor unit while highly volatile propane is being blown about through broken hosing under the influence of an operating compressor pump. Such reluctance induces delay in decision making that, of course, only makes the problem much worse, since, under such adverse circumstances every second counts. Such a crisis could be initiated even absent hose breakage, such as, for example, in the event of slippage of a fitting at the site of storage tank on the truck carrying the propane. The instant invention serves to promptly and efficaciously obviate any such crisis, since, as was just noted, a delivery person has only to rotate valvular means 14 through an angle of 90° as illustrated with resort to FIG. 11 to permit the air in the system to escape via hole 25 seen in FIGS. 9 and 11 thereby causing a drop in pressure significant enough to cause pressure dependent actuation cylinder 2 to bring about prompt closure of release valve B.

In conclusion, respectfully submitted, the instant invention is virtually revolutionary in respect of advancing the art of intertank transportation of highly explosive or corrosive fluids especially from an all important safety vantage point and is consequently indeed new, useful and unique.

What is claimed is:

1. A Multicannular Fluid Delivery System With Attached Manifold Rings, comprising:
   a. a first cylindrically shaped, flexible outer hosing component with length in excess of a greatest diameter of said first cylindrically shaped, flexible hosing component;
   b. a second cylindrically shaped, flexible inner hosing component with length in excess of a greatest diameter of said second cylindrically shaped, flexible hosing component;
   c. said second hose component being entirely circumscribed by said first hosing component;
   d. a first manifold ring being affixed to a first end of said first hosing component and to a first end of said second hosing component;
   e. said first manifold ring having a solid body portion and being cylindrically shaped about a centrally positioned first through hole, a diameter of which said first through hole is similar in size to said greatest diameter of said second hosing component;
   f. said first through hole being circumscribed by a plurality of ancillary first ring holes through an end side of said solid body portion of said first manifold ring with diameters less than said diameter of said first through hole;
   g. said ancillary first ring holes being in direct access to a hollowed out cylindrically shaped first ring space within said solid body portion of said first manifold ring and being also in direct access to space as between said first hosing component and said second hosing component;
   h. said first manifold ring being fitted with a first hollow extrusion affixed to a circumferential outer surface of said first manifold ring with said first hollow extrusion being in direct access to said hollowed out cylindrically shaped first ring space;
   i. a second manifold ring being affixed to a second end of said first hosing component and to a second end of said second hosing component;
   j. said second manifold ring having a solid body portion and being cylindrically shaped about a centrally positioned second through hole, a diameter of which said second through hole is similar in size to said greatest diameter of said second hosing component;
   k. said second through hole being circumscribed by a plurality of ancillary second ring holes through an inner end side of said solid body portion of said second manifold ring with diameters less than said diameter of said first through hole;
   l. said ancillary second ring through holes being in direct access to a hollowed out cylindrically shaped second ring space within said solid body portion of said second manifold ring and being also in direct access to said space as between said first hosing component and said second hosing component;
   m. said second manifold ring being fitted with a hollow extrusion affixed to a circumferential outer surface of said second manifold ring with said hollow extrusion being in direct access to said hollowed out cylindrically shaped second ring space, and;
   n. valvular means being affixed to and completely covering and sealing said hollow extrusion.

2. The multicannular fluid delivery system with attached manifold rings of claim 1, whereby a plurality of stiff struts are affixed to inner walling of said first hosing component and to outer walling of said second hosing component at a plurality of locations along said length of said first hosing component and along said length of said second hosing component.

3. A Multicannular Fluid Delivery System With Attached Manifold Rings, comprising:
   a. a first cylindrically shaped, flexible hosing component with length in excess of a greatest diameter of said first cylindrically shaped, flexible hosing component;
   b. a second cylindrically shaped, flexible hose component with length in excess of a greatest diameter of said second cylindrically shaped, flexible hosing component;
   c. said second hose component being entirely circumscribed by said first hosing component;
   d. a first manifold ring being affixed to a first end of said first hosing component and to a first end of said second hosing component;
   e. said first manifold ring having a solid body portion and being cylindrically shaped about a centrally positioned first through hole, a diameter of which said first through hole is similar in size to said greatest diameter of said second hosing component;
   f. said first through hole being circumscribed by a plurality of ancillary first ring holes through an end side of said solid body portion of said first manifold ring with diameters less than said diameter of said first through hole;
   g. said ancillary first ring holes being in direct access to a hollowed out cylindrically shaped first ring space within said solid body portion of said first manifold ring and being also in direct access to space as between said first hose component and said second hose component;
   h. said first manifold ring having an outer first ring through hole in a circumferential outer surface of said first manifold ring with said first ring through hole being in direct access to said hollowed out cylindrically shaped first ring space;

i. a second manifold ring being affixed to a second end of said first hosing component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hosing component and said second hosing component;

m. said second manifold ring having an outer second ring through hole in a circumferential outer surface of said second manifold ring with said outer second ring through hole being in direct access to said hollowed out cylindrically shaped second ring space, and;

n. valvular means being affixed to said circumferential outer surface of said second manifold ring and completely covering and sealing said outer second ring through hole.

4. The multicannular fluid delivery system with attached manifold rings of claim 3, whereby a plurality of stiff struts are affixed to inner walling of said first hosing component and to outer walling of said second hosing component at a plurality of locations along said length of said first hosing component and along said length of said second hosing component.

5. A Multicannular Fluid Delivery System With Attached Manifold Rings, comprising:

a. a first cylindrically shaped, flexible hose component with length in excess of a greatest diameter of said first cylindrically shaped, flexible hosing component;

b. a second cylindrically shaped, flexible hose component with length in excess of a greatest diameter of said second cylindrically shaped, flexible hosing component;

c. said second hose component being entirely circumscribed by said first hosing component;

d. a first manifold ring being affixed to a first end of said first hosing component and to a first end of said second hosing component;

e. said first manifold ring having a solid body portion and being cylindrically shaped about a centrally positioned first through hole, a diameter of which said first through hole is similar in size to said greatest diameter of said second hosing component;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hosing component and said second hosing component;

h. said first manifold ring having an outer first ring through hole in a circumferential outer surface of said first manifold ring with said first ring through hole being in direct access to said hollowed out cylindrically shaped first ring space;

i. a second manifold ring being affixed to a second end of said first hose component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hose component and said second hosing component;

m. said second manifold ring having an outer second ring through hole in a circumferential outer surface of said second manifold ring with said outer second ring through hole being in direct access to said hollowed out cylindrically shaped second ring space;

n. valvular means being affixed to said circumferential outer surface of said second manifold ring and completely covering and sealing said outer second ring through hole, and;

o. nozzle means being affixed to an outer end side of said second manifold ring.

6. The multicannular fluid delivery system with attached manifold rings of claim 5, whereby a plurality of stiff struts are affixed to inner walling of said first hosing component and to outer walling of said second hosing component at a plurality of locations along said length of said first hosing component and along said length of said second hosing component.

7. A Multicannular Fluid Delivery System With Attached Manifold Rings, comprising:

a. a first cylindrically shaped, flexible outer hosing component with length in excess of a greatest diameter of said first cylindrically shaped, flexible hosing component;

b. a second cylindrically shaped, flexible inner hosing component with length in excess of a greatest diameter of said second cylindrically shaped, flexible hosing component;

c. said second hose component being entirely circumscribed by said first hosing component;

d. a first manifold ring being affixed to a first end of said first hosing component and to a first end of said second hosing component;

e. said first manifold ring having a solid body portion and being cylindrically shaped about a centrally positioned first through hole, a diameter of which said first through hole is similar in size to said greatest diameter of said second hosing component;

f. said first through hole being circumscribed by a plurality of ancillary first ring holes through an end side of said solid body portion of said first manifold ring with diameters of said ancillary first ring holes being less than said diameter of said first through hole;

g. said ancillary first ring holes being in direct access to a hollowed out cylindrically shaped first ring space within said solid body portion of said first manifold ring and being also in direct access to space as between said first hosing component and said second hosing component;

h. said first manifold ring being fitted with a first hollow extrusion affixed to a circumferential outer surface of said first manifold ring with said first hollow extrusion being in direct access to said hollowed out cylindrically shaped first ring space;

i. a second manifold ring being affixed to a second end of said first hosing component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hosing component and said second hosing component;

m. said second manifold ring being fitted with a hollow extrusion affixed to a circumferential outer surface of said second manifold ring with said hollow extrusion being in direct access to said hollowed out cylindrically shaped second ring space;

n. valvular means being affixed to and completely covering and sealing said hollow extrusion, and;

o. nozzle means being affixed to an outer end side of said second manifold ring.

8. The multicannular fluid delivery system with attached manifold rings of claim 7, whereby a plurality of stiff struts are affixed to inner walling of said first hosing component and to outer walling of said second hosing component at a plurality of locations along said length of said first hosing component and along said length of said second hosing component.

9. A Multicannular Fluid Delivery System With Attached Manifold Rings, comprising:

a. a first cylindrically shaped, flexible outer hosing component with length in excess of a greatest diameter of said first cylindrically shaped, flexible hosing component;

b. a second cylindrically shaped, flexible inner hosing component with length in excess of a greatest diameter of said second cylindrically shaped, flexible hosing components;

c. said second hose component being entirely circumscribed by said first hosing component;

d. a first manifold ring being affixed to a first end of said first hosing component and to a first end of said second hosing component;

e. said first manifold ring having a solid body portion and being cylindrically shaped about a centrally positioned first through hole, a diameter of which said first through hole is similar in size to said greatest diameter of said second hosing component;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hosing component and said second hosing component;

h. said first manifold ring being fitted with a first hollow extrusion affixed to a circumferential outer surface of said first manifold ring with said first hollow extrusion being in direct access to said hollowed out cylindrically shaped first ring space;

i. a second manifold ring being affixed to a second end of said first hosing component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hosing component and said second hosing component;

m. said second manifold ring having an outer second ring through hole in a circumferential outer surface of said second manifold ring with said outer second ring through hole being in direct access to said hollowed out cylindrically shaped second ring space, and;

n. valvuar means being affixed to said circumferential outer surface of said second manifold ring and completely covering and sealing said outer second ring through hole.

10. The multicannular fluid delivery system with attached manifold rings of claim 9, whereby a plurality of stiff struts are affixed to inner walling of said first hosing component and to outer walling of said second hosing component at a plurality of locations along said length of said first hosing component and along said length of said second hosing component.

11. A Multicannular Fluid Delivery System With Attached Manifold Rings, comprising:

a. a first cylindrically shaped, flexible outer hosing component with length in excess of a greatest diameter of said first cylindrically shaped, flexible hosing component;

b. a second cylindrically shaped, flexible inner hosing component with length in excess of a greatest diameter of said second cylindrically shaped, flexible hosing components;

c. said second hose component being entirely circumscribed by said first hosing component;

d. a first manifold ring being affixed to a first end of said first hosing component and to a first end of said second hosing component;

e. said first manifold ring having a solid body portion and being cylindrically shaped about a centrally positioned first through hole, a diameter of which said first through hole is similar in size to said greatest diameter of said second hosing component;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hosing component and said second hosing component;

h. said first manifold ring having an outer first ring through hole in a circumferential outer surface of said first manifold ring with said first ring through hole being in direct access to said hollowed out cylindrically shaped first ring space;

i. a second manifold ring being affixed to a second end of said first hosing component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hosing component and said second hosing component;

m. said second manifold ring being fitted with a hollow extrusion affixed to a circumferential outer surface of said second manifold ring with said hollow extrusion being in direct access to said hollowed out cylindrically shaped second ring space, and;

n. valvular means being affixed to and completely covering and sealing said hollow extrusion.

12. The multicannular fluid delivery system with attached manifold rings of claim 11, whereby a plurality of stiff struts are affixed to inner walling of said first hosing component and to outer walling of said second hosing component at a plurality of locations along said length of said first hosing component and along said length of said second hosing component.

13. A Multicannular Fluid Delivery System With Attached Manifold Rings, comprising:

a. a first cylindrically shaped, flexible outer hosing component with length in excess of a greatest diameter of said first cylindrically shaped, flexible hosing component;

b. a second cylindrically shaped, flexible inner hosing component with length in excess of a greatest diameter of said second cylindrically shaped, flexible hosing components;

c. said second hose component being entirely circumscribed by said first hosing component;

d. a first manifold ring being affixed to a first end of said first hosing component and to a first end of said second hosing component;

e. said first manifold ring having a solid body portion and being cylindrically shaped about a centrally positioned first through hole, a diameter of which said first through hole is similar in size to said greatest diameter of said second hosing component;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hosing component and said second hosing component;

h. said first manifold ring being fitted with a first hollow extrusion affixed to a circumferential outer surface of said first manifold ring with said first hollow extrusion being in direct access to said hollowed out cylindrically shaped first ring space;

i. a second manifold ring being affixed to a second end of said first hosing component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hosing component and said second hosing component;

m. said second manifold ring having an outer second ring through hole in a circumferential outer surface of said second manifold ring with said outer second ring through hole being in direct access to said hollowed out cylindrically shaped second ring space;

n. valvular means being affixed to said circumferential outer surface of said second manifold ring and completely covering and sealing said outer second ring through hole, and;

o. nozzle means being affixed to an outer end side of said second manifold ring.

14. The multicannular fluid delivery system with attached manifold rings of claim 13, whereby a plurality of stiff struts are affixed to inner walling of said first hosing component and to outer walling of said second hosing component at a plurality of locations along said length of said first hosing component and along said length of said second hosing component.

15. A Multicannular Fluid Delivery System With Attached Manifold Rings, comprising:

a. a first cylindrically shaped, flexible outer hosing component with length in excess of a greatest diameter of said first cylindrically shaped, flexible hosing component;

b. a second cylindrically shaped, flexible inner hosing component with length in excess of a greatest diameter of said second cylindrically shaped, flexible hosing components;

c. said second hose component being entirely circumscribed by said first hosing component;

d. a first manifold ring being affixed to a first end of said first hosing component and to a first end of said second hosing component;

e. said first manifold ring having a solid body portion and being cylindrically shaped about a centrally positioned first through hole, a diameter of which said first through hole is similar in size to said greatest diameter of said second hosing component;

f. said first through hole being circumscribed by a plurality of ancillary first ring holes through an end side of said solid body portion of said first manifold ring with diameters less than said diameter of said first through hole;

g. said ancillary first ring holes being in direct access to a hollowed out cylindrically shaped first ring space within said solid body portion of said first manifold ring and being also in direct access to space as between said first hosing component and said second hosing component;

h. said first manifold ring having an outer first ring through hole in a circumferential outer surface of said first manifold ring with said first ring through hole being in direct access to said hollowed out cylindrically shaped first ring space;

i. a second manifold ring being affixed to a second end of said first hosing component and to a second end of said second hosing component;

j. said second manifold ring having a solid body portion and being cylindrically shaped about a centrally positioned second through hole, a diameter of which said second through hole is similar in size to said greatest diameter of said second hosing component;

k. said second through hole being circumscribed by a plurality of ancillary second ring holes through an inner end side of said solid body portion of said second manifold ring with diameters less than said diameter of said first through hole;

l. said ancillary second ring through holes being in direct access to a hollowed out cylindrically shaped second ring space within said solid body portion of said second manifold ring and being also in direct access to said space as between said first hosing component and said second hosing component;

m. said second manifold ring being fitted with a hollow extrusion affixed to a circumferential outer surface of said second manifold ring with said hollow extrusion being in direct access to said hollowed out cylindrically shaped second ring space;

n. valvular means being affixed to and completely covering and sealing said hollow extrusion, and;

o. nozzle means being affixed to an outer end side of said second manifold ring.

16. The multicannular fluid delivery system with attached manifold rings of claim 15, whereby a plurality of stiff struts are affixed to inner walling of said first hosing component and to outer walling of said second hosing component at a plurality of locations along said length of said first hosing component and along said length of said second hosing component.

* * * * *